Patented Oct. 31, 1944

2,361,822

UNITED STATES PATENT OFFICE 2,361,822

DIAZINE DERIVATIVES

Gaetano F. D'Alelio and James W. Underwood, Pittsfield, Mass., assignors to General Electric Company, a corporation of New York No Drawing. Application May 21, 1942, Serial No. 443,979

20 Claims. (Cl. 260—251)

This invention relates to new chemical compounds and more particularly to diazine derivatives. The invention especially is concerned with the production of new and useful diamino pyrimidyl halogeno carboxy-, carboaliphaticoxy- and carboaromaticoxy-alkyl sulfides.

The chemical compounds of this invention may be represented by the following general formula:

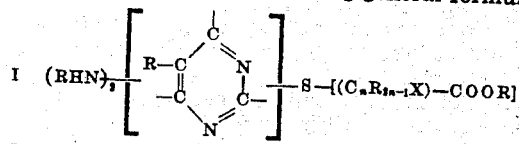

In the above formula $n$ represents an integer and is at least 1 and not more than 2, X represents a halogen atom, more particularly a chlorine, bromine, fluorine or iodine atom, and R represents a member of the class consisting of hydrogen and monovalent hydrocarbon and substituted hydrocarbon radicals, more particularly halo-hydrocarbon radicals.

Illustrative examples of radicals that R in the above formula may represent are: aliphatic (e. g., methyl, ethyl, propyl, isopropyl, butyl, secondary butyl, isobutyl, butenyl, amyl, isoamyl, hexyl, octyl, allyl, methallyl, ethallyl, crotyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, phenylethyl, cinnamyl, phenylpropyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, fluorophenyl, iodophenyl, bromotolyl, etc. Preferably R in the —NHR groupings of Formula I is hydrogen and the R in the —COOR grouping is either hydrogen or an unsubstituted monovalent hydrocarbon radical, e. g., an aliphatic radical such as methyl, ethyl, propyl, butyl, pentyl, hexyl, allyl, methallyl, crotyl, etc. However, there also may be produced in accordance with the present invention compounds such, for instance, as those represented by the general formulas:

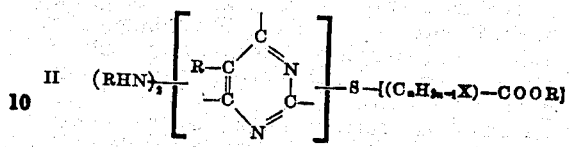

and, more particularly,

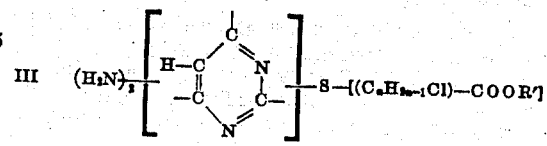

and

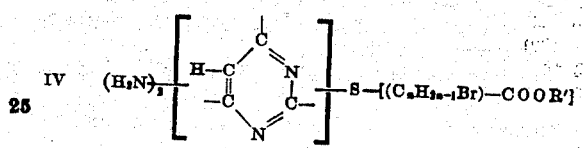

where $n$, X and R have the same meanings as given above with respect to Formula I and R' (Formulas III and IV) represents hydrogen or an unsubstituted monovalent hydrocarbon radical, numerous examples of which have been given above.

The new compounds of this invention may be used, for example, as pharmaceuticals, plasticizers and as intermediates in the preparation of derivatives thereof such as hydrazo, hydrazino, carbazido, semicarbazido, ureido, amidine, methylol, etc., derivatives of the individual compound embraced by Formula I. Compounds containing a —COOH grouping may be amidated; or the hydrogen of the carboxy grouping may be replaced by a substituent such, for instance, as an ammonium radical or a monovalent metal, e. g., an alkali metal such as sodium, potassium, lithium, etc. Our new compounds are especially valuable in the preparation of synthetic resinous compositions. Thus, they may be condensed with, for instance, aldehydes, including polymeric aldehydes, hydroxyaldehydes and aldehyde-addition products, to yield condensation products of particular utility in the plastics and coating arts. They are particularly useful as such or in the form of their soluble, fusible aldehyde-reaction products as agents for accelerating the conversion of acid-curing thermosetting resins, e. g., acid-curing thermosetting aminoplasts and phenoplasts, to an insoluble, infusible state. Aldehyde-reaction products of the diazine derivatives embraced by Formula I and acid-curing thermosetting resins containing the said diazine derivatives or their soluble, fusible aldehyde-reaction products are more fully described and are specifically claimed in our copending application Serial No. 443,978, filed May 21, 1942. These new compounds also may be compounded with rubber, both natural and synthetic, to modify the properties of the rubber.

Various methods may be employed to produce the chemical compounds of this invention. We prefer to prepare them by effecting reaction, in the presence of a hydrohalide acceptor, between equimolecular proportions of a mercapto (monomercapto) diamino pyrimidine and a carboxy-, carboaliphaticoxy- or carboaromaticoxy-alkyl dihalide. When a carboxy (—COOH) alkyl dihalide is used as a starting reactant and the proportions of reactants and reaction conditions are such that the hydrogen atom of the —COOH grouping is replaced by the residue of the hydrohalide acceptor, e. g., by an alkali metal, the carboxy compound desired as a final product is obtained by treating this intermediate product with hydrochloric, hydrobromic, sulfuric or other suitable inorganic or organic acid in an amount just sufficient to form the desired carboxy derivative.

Illustrative examples of diamino mercapto pyrimidines that may be employed, depending upon the particular end-product sought, are:

2-mercapto 4,6-diamino pyrimidine
4-mercapto 2,6-diamino pyrimidine
2-mercapto 4,6-diamino 5-methyl pyrimidine
4-mercapto 2,6-diamino 5-ethyl pyrimidine
2-mercapto 4-bromotoluido 6-benzylamino pyrimidine
2-toluido 4-mercapto 6-methylamino pyrimidine
2-mercapto 4-phenylchloroethylamino 6-phenethylamino pyrimidine
2-mercapto 4-chloroanilino 6-ethylphenylamino pyrimidine
2-mercapto 4-cycloheptylamino 6-isopropylamino pyrimidine
2-mercapto 4,6-di-(methylamino) pyrimidine
2-mercapto 4,6-di-(fluorophenylamino) pyrimidine
4-mercapto 2,6-di-(methylamino) pyrimidine
2-mercapto 4,6-di-(methylamino) 5-methyl pyrimidine
4-mercapto 2,6-di-(methylamino) 5-phenyl pyrimidine
2-mercapto 4-chloroethylamino 6-methylamino pyrimidine
2-mercapto 4,6-di-(anilino) pyrimidine
2-mercapto 4,6-di-(anilino) 5-butyl pyrimidine
2-mercapto 4-xenylamino 5-cyclopentyl 6-amylamino pyrimidine
2-toluido 4-mercapto 5-cyclohexenyl 6-amino pyrimidine (2-toluido 4-amino 5-cyclohexenyl 6-mercapto pyrimidine)
2-mercapto 4-amino 6-ethylamino pyrimidine
2-mercapto 4,6-di-(propylamino) pyrimidine
2-allylamino 4-mercapto 6-chlorophenylamino pyrimidine
2-amylamino 4-mercapto 5-phenyl 6-amino pyrimidine
2-dichloroanilino 4-mercapto 5-tolyl 6-propylamino pyrimidine
2-cycloheptylamino 4-mercapto 6-isobutylamino pyrimidine
2-mercapto 4-allylamino 6-butylamino pyrimidine
2-mercapto 4-(3'-butenylamino) 6-isopropylamino pyrimidine
2-mercapto 4-isobutylamino 6-cyclopentylamino pyrimidine
2-mercapto 4-isobutylamino 5-propyl 6-cyclopentylamino pyrimidine
2-mercapto 4-amino 6-chloroxenylamino pyrimidine
2-mercapto 4-ethylphenylamino 5-naphthyl 6-xylidino pyrimidine
2-mercapto 4-phenethylamino 5-(2'-butenyl) 6-cyclopentenylamino pyrimidine
2-mercapto 4,6-diamino 5-bromotolyl pyrimidine
2-mercapto 4-amino 5-phenylisopropyl 6-chlorocyclohexylamino pyrimidine
2-mercapto 4-isobutylamino 6-bromonaphthylamino pyrimidine
2-mercapto 4,6-di-(iodophenylamino) pyrimidine Illustrative examples of carboxy-, carboaliphaticoxy- and carboaromaticoxy-alkyl dihalides that may be used, depending upon the desired end-product, are:

Dichloro carboxy methane
Dibromo carboxy methane
The dichloro carboalkoxy (e. g., carbomethoxy, carboethoxy, carbopropoxy, carbobutoxy, etc.) methanes
The dibromo carboalkoxy methanes
The dichloro carboaroxy (e. g., carbophenoxy, carbonaphthoxy, etc.) methanes
The dibromo carboaroxy methanes
The dichloro carboalkoxy ethanes
The dibromo carboalkoxy ethanes
The diiodo carboalkoxy ethanes
The dichloro carboaroxy ethanes
The dibromo carboaroxy ethanes
The diiodo carboaroxy ethanes
Alpha,beta-dichloro carboethoxy ethane
Alpha,beta-bibromo carboethoxy ethane
Alpha,alpha-dichloro carbobutoxy ethane
Alpha,alpha-dibromo carbobutoxy ethane
Alpha,alpha-dichloro carboethoxy ethane
Alpha,alpha-dibromo carboethoxy ethane
Beta,beta-dichloro carboethoxy ethane
Beta,beta-dibromo carboethoxy ethane
Beta,beta-dichloro carbopropoxy ethane
Beta,beta-dibromo carbopropoxy ethane
Alpha,alpha-dichloro carbopropoxy ethane
Alpha,alpha-dibromo carbopropoxy ethane
Alpha,beta-dichloro carbopropoxy ethane
Alpha,beta-dibromo carbopropoxy ethane
Alpha,alpha-diiodo carboethoxy ethane
Alpha,alpha-diiodo carbophenoxy propane
Alpha-bromo alpha-iodo gamma-phenyl carbonaphthoxy propane
Beta,beta-dichloro carbotoloxy ethane
Beta-isobutyl beta,beta-dibromo carbo-xyloxy ethane
Alpha-chlorophenyl beta-naphthyl beta,beta-diiodo carbobenzoxy ethane
Alpha-cyclopentyl alpha-tolyl beta-chloro beta-iodo carbophenethoxy propane
Alpha-benzyl beta-cyclohexyl alpha,beta-dichloro carbocyclopentoxy pentane Alpha-xylyl beta,beta-diphenyl alpha,beta-dibromo carbocyclohexoxy ethane
Alpha-bromonaphthyl beta-cresyl beta-tolyl alpha,beta-dichloro carbophenoxy ethane
Beta-phenyl alpha,beta-dichloro carboethoxy propane
Beta-ethyl alpha,beta-dibromo carbophenoxy propane Various hydrohalide acceptors may be employed. We prefer to use a hydrohalide acceptor that will react with the mercapto pyrimidine to form a water-soluble salt. Examples of such acceptors are the alkali-metal hydroxides, e. g., sodium hydroxide, potassium hydroxide, etc. Additional examples of hydrohalide acceptors that may be used are other inorganic bases, e. g., calcium hydroxide, barium hydroxide, ammonium hydroxide, etc.; carbonates of inorganic bases, including the carbonates of alkali metals; organic amines such as tertiary amines, e. g., trimethyl amine, triethyl amine, tributyl amine, pyridine, dimethyl aniline, quinoline, etc.; quaternary ammonium bases, e. g., tetramethyl ammonium hydroxide, etc.; and the like.

The reaction between the mercapto diamino pyrimidine and the chosen carboxy-, carboaliphaticoxy- or carboaromaticoxy-alkyl dihalide may be carried out in any suitable manner, but preferably is effected in the presence of a suitable solvent or mixture of solvents. Although various solvents and solvent mixtures may be employed, for economic reasons and because of their eminent suitability we prefer to use water or a mixture of water and alcohol. The reaction may be carried out under a variety of temperature and pressure conditions, for instance at normal, sub-normal or at elevated temperatures and at atmospheric, sub-atmospheric or super-atmospheric pressures.

The above reaction may be represented by the following general equation:

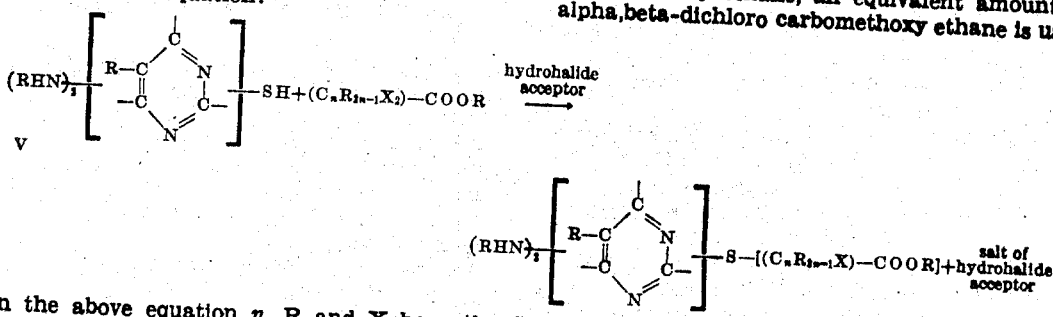

In the above equation $n$, R and X have the same meanings as given above with reference to Formula I.

The new chemical compounds of this invention also may be prepared by a process which comprises effecting reaction between approximately equimolecular proportions of a halogenated diamino pyrimidine and the carboxy, carboaliphaticoxy or carboaromaticoxy monomercapto monohalide. This reaction preferably is carried out in the presence of an anhydrous solvent. An anhydrous solvent, e. g., alcohol, is desirable because one of the reactants, namely, the halogenated diamino pyrimidine, is hydrolyzable. The other conditions for preparing the compounds of the invention may be the same as described above with reference to the first-mentioned method of preparation.

In order that those skilled in the art better may understand how the present invention may be carried into effect, the following illustrative examples are given. All parts are by weight.

*Example 1*

This example illustrates the preparation of 4,6-diamino pyrimidyl-2 bromo carbomethoxy-ethyl sulfide, the formula for which is

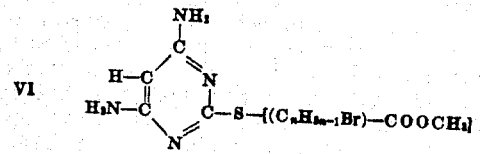

where $n$ has a value of 2.

| | Parts |
|---|---|
| 2-mercapto 4,6-diamino pyrimidine | 71.0 |
| Alpha,beta - dibromo carbomethoxy ethane | 123.0 |
| Sodium hydroxide | 20.0 |
| Water | 1250.0 | where stirred together rapidly at room temperature for 3 hours, yielding a precipitate comprising 4,6-diamino pyrimidyl-2 bromo carbomethoxy-ethyl sulfide. This precipitate was filtered off, washed free of soluble salts and dried to obtain the purified product.

*Example 2*

2,6-diamino pyrimidyl-4 bromo carbomethoxy-ethyl sulfide is prepared in essentially the same manner as described under Example 1 with the exception that 4-mercapto 2,6-diamino pyrimidine is used instead of 2-mercapto 4,6-diamino pyrimidine.

*Example 3*

4,6-diamino pyrimidyl-2 chloro carbomethoxy-ethyl sulfide is prepared in essentially the same manner as described under Example 1 with the exception that, instead of alpha,beta-dibromo carbomethoxy ethane, an equivalent amount of alpha,beta-dichloro carbomethoxy ethane is used.

*Example 4*

4,6-di-(methylamino) pyrimidyl-2 bromo carbomethoxy-ethyl sulfide is prepared in essentially the same manner as described under Example 1 with the exception that, instead of 2-mercapto 4,6-diamino pyrimidine, an equivalent amount of 2-mercapto 4,6-di-(methylamino) pyrimidine is used.

*Example 5*

4,6-diamino pyrimidyl-2 bromo carboethoxy-ethyl sulfide is prepared in essentially the same manner as described under Example 1 with the exception that, instead of alpha,beta-dibromo carbomethoxy ethane, an equivalent amount of alpha,beta-dibromo carboethoxy ethane is employed.

*Example 6*

4,6-diamino pyrimidyl-2 chloro carbophenoxy-ethyl sulfide is prepared in essentially the same manner as described under Example 1 with the exception that, instead of alpha,beta-dibromo carbomethoxy ethane, an equivalent amount of alpha,beta-dichloro carbophenoxy ethane is used.

Other examples of the chemical compounds of this invention are listed below:

The diamino pyrimidyl halogeno carboaliphaticoxy-methyl sulfides, including the diamino pyrimidyl chloro carboaliphaticoxy-methyl sulfides, the diamino pyrimidyl bromo carboaliphaticoxy-methyl sulfides, the diamino pyrimidyl iodo carboaliphaticoxy-methyl sulfides and the diamino pyrimidyl fluoro carboaliphaticoxy-methyl sulfides, more particularly the diamino pyrimidyl halogeno (e. g., chloro, bromo, etc.), alkoxy (e. g., methoxy, ethoxy, propoxy, butoxy, etc.)-methyl sulfides The diamino pyrimidyl halogeno carboaroxy-methyl sulfides, more particularly the diamino pyrimidyl chloro carboaroxy-methyl sulfides, the diamino pyrimidyl bromo carboaroxy-methyl sulfides, the diamino pyrimidyl iodo carboaroxy-methyl sulfides and the diamino pyrimidyl fluoro carboaroxy-methyl sulfides The diamino pyrimidyl halogeno (chloro, bromo, iodo, fluoro) carboxy-methyl sulfides The diamino pyrimidyl halogeno (chloro, bromo, iodo, fluoro) carboaliphaticoxy (e. g., carboalkoxy)-ethyl sulfides The diamino pyrimidyl halogeno (chloro, bromo, iodo, fluoro) carboaroxy (e. g., carbophenoxy, carbotoloxy, etc.)-ethyl sulfides 2,6-diamino pyrimidyl-4 chloro carbomethoxy-ethyl sulfides 2,6-di-(methylamino) pyrimidyl-4 bromo carbomethoxy-ethyl sulfides 2,6-diamino pyrimidyl-4 bromo carbophenoxy-ethyl sulfides 4,6-diamino pyrimidyl-2 chloro carbophenoxy-ethyl sulfides 2,6-diamino pyrimidyl-4 chloro carbophenoxy-ethyl sulfides 4-amino 6-methylamino pyrimidyl-2 bromo carboxy-methyl sulfide 4,6-diamino 5-methyl pyrimidyl-2 chloro carbomethoxy-methyl sulfide 4-pentylamino 6-benzylamino 5-naphthyl pyrimidyl-2 alpha-(beta-iodo carbomethoxy-ethyl) sulfide 2,6-di-(anilino) 5-benzyl pyrimidyl-4 beta-(alpha-bromo carbophenoxy) sulfide 2,6-di-(benzylamino) 5-cyclopentyl pyrimidyl-4 alpha-(alpha-chloro carbotoloxy-ethyl) sulfide 2-toluido 6-xylidino 5-tolyl pyrimidyl-4 beta-(beta-iodo carbobenzoxy-pentyl) sulfide 4,6-di-(ethylamino) pyrimidyl-2 chloro carboxy-methyl sulfide 4,6-di-(anilino) pyrimidyl-2 chloro carboxy-methyl sulfide 4,6-di-(bromoanilino) pyrimidyl-2 bromo carboxy-methyl sulfide 4,6-di-(cyclohexylamino) pyrimidyl-2 chloro carboxy-methyl sulfide 4,6-diamino pyrimidyl-2 alpha-(alpha-chloro carbomethoxy-methyl) sulfide 2,6-diamino 5-methyl pyrimidyl-4 beta-(beta-bromo carboethoxy-ethyl) sulfide 4,6-diamino 5-phenyl pyrimidyl-2 alpha-(beta-chloro carbopropoxy-ethyl) sulfide 2,6-diamino pyrimidyl-4 beta-(alpha-chloro carboethoxy-ethyl) sulfide 4,6-di-(methylamino) pyrimidyl-2 bromo carbobutoxy-methyl sulfide 4,6-diamino pyrimidyl-2 alpha-(alpha-chloro carbophenoxy-ethyl) sulfide 4,6-diamino pyrimidyl-2 beta-(beta-bromo carbophenoxy-ethyl) sulfide 2,6-diamino 5-propyl pyrimidyl-4 alpha-(beta-chloro carbophenoxy-ethyl) sulfide 2,6-diamino 5-chlorophenyl pyrimidyl-4 beta-(alpha-bromo carbophenoxy-ethyl) sulfide 4,6-diamino pyrimidyl-2 alpha-(alpha-chloro carbophenoxy-propyl) sulfide 4,6-di-(anilino) pyrimidyl-2 alpha-(alpha-iodo carbophenoxy-propyl) sulfide 4,6-di-(cyclopentylamino) 5-chloroethyl pyrimidyl-2 alpha-(gamma-phenyl alpha-chloro carbonaphthoxy-propyl) sulfide 4-ethylamino 5-methyl 6-amino pyrimidyl-2 beta-(beta-chloro carbotoloxy-ethyl) sulfide 4-isobutylamino 6-neopentylamino pyrimidyl-2 beta-(alpha-phenyl beta-naphthyl beta-iodo carbobenzoxy-ethyl) sulfide 2-naphthylamino 5-fluorophenyl 6-amino pyrimidyl-4 beta-(beta-isobutyl beta-bromo carboxyloxy-ethyl) sulfide 4-benzylamino 6-toluido pyrimidyl-2 beta-(alpha-tolyl alpha-cyclopentyl beta-chloro carbophenethoxy-propyl) sulfide 4-phenethylamino 6-xylidino pyrimidyl-2 alpha-(alpha-phenethyl beta-phenyl beta-bromo carbocyclopentoxy-ethyl) sulfide 4,6-diamino pyrimidyl-2 alpha-(alpha-chloro carboxy-ethyl) sulfide 2,6-diamino pyrimidyl-4 beta-(beta-bromo carboxy-ethyl) sulfide 4,6-diamino 5-iodophenyl pyrimidyl-2 alpha-(beta-iodo carboxy-ethyl) sulfide 4,6-diamino pyrimidyl-2 beta-(alpha-bromo carboxy-ethyl) sulfide 4-cyclopentenylamino 6-chloroxylidino pyrimidyl-2 beta-(alpha-chloro beta-benzyl carboethoxy-propyl) sulfide 4-amino 6-methylamino pyrimidyl-2 alpha-(beta-chlorophenyl beta-chloro carboethoxy-ethyl) sulfide It will be understood, of course, by those skilled in the art that, in those compounds listed above that are generically named, the amino (—NHR) groups and the thio group may be attached in any arrangement to the symmetrical carbon atoms of the pyrimidine nucleus. In other words, the term "diamino pyrimidyl" includes within its meaning both the 4,6-diamino pyrimidyl-2 and the 2,6-diamino pyrimidyl-4 (2,4-diamino pyrimidyl-6) compounds.

In a manner similar to that described above with particular reference to the diamino [(—NHR)$_2$] pyrimidyl halogeno carboxy-, carboaliphaticoxy- and carboaromaticoxy-methyl and -ethyl sulfides, corresponding derivatives of the 1,2- or ortho-diazines (pyridazines) and of the 1,4- or para-diazines (pyrazines) may be prepared. It also will be understood by those skilled in the art from the foregoing description of the preparation of a diazine monosulfide that similar compounds may be prepared in which two or three sulfur atoms are attached directly to a carbon atom of the diazine nucleus and which have attached to each sulfur atom a $$-[(C_nR_{2n-1}X)-COOR]$$

grouping, where $n$, $X$ and $R$ have the same meanings as given above with reference to Formula I.

What we claim as new and desire to secure by Letters Patent of the United States is:

1. Chemical compounds corresponding to the general formula

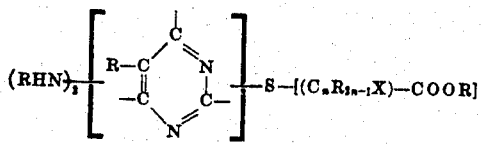

where $n$ represents an integer and is at least 1 and not more than 2, X represents a halogen atom, and R represents a member of the class consisting of hydrogen and monovalent hydrocarbon and halo-hydrocarbon radicals.

2. Chemical compounds as in claim 1 wherein R represents a hydrogen atom.

3. Chemical compounds as in claim 1 wherein X represents a chlorine atom.

4. Chemical compounds as in claim 1 wherein X represents a bromine atom.

5. Chemical compounds corresponding to the general formula

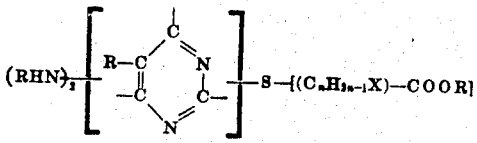

where $n$ represents an integer and is at least 1 and not more than 2, X represents a halogen atom, and R represents a member of the class consisting of hydrogen and monovalent hydrocarbon and halo-hydrocarbon radicals.

6. Chemical compounds corresponding to the general formula

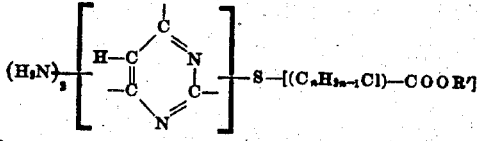

where $n$ represents an integer and is at least 1 and not more than 2, and R' represents a member of the class consisting of hydrogen and unsubstituted monovalent hydrocarbon radicals.

7. Chemical compounds corresponding to the general formula

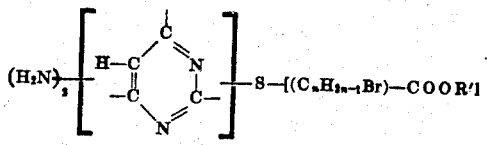

where $n$ represents an integer and is at least 1 and not more than 2, and R' represents a member of the class consisting of hydrogen and unsubstituted monovalent hydrocarbon radicals.

8. A diamino pyrimidyl halogeno carboaliphaticoxy-ethyl sulfide.

9. A diamino pyrimidyl chloro carboalkoxyethyl sulfide.

10. A 4,6-diamino pyrimidyl-2 chloro carbomethoxy-ethyl sulfide.

11. A diamino pyrimidyl bromo carboalkoxyethyl sulfide.

12. A 4,6-diamino pyrimidyl-2 bromo carbomethoxy-ethyl sulfide.

13. A diamino pyrimidyl halogeno carboaromaticoxy-ethyl sulfide.

14. A diamino pyrimidyl chloro carboaromaticoxy-ethyl sulfide.

15. A 4,6-diamino pyrimidyl-2 chloro carbophenoxy-ethyl sulfide.

16. The method of preparing chemical compounds corresponding to the general formula

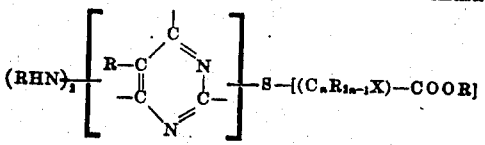

where $n$ represents an integer and is at least 1 and not more than 2, X represents a halogen atom, and R represents a member of the class consisting of hydrogen and monovalent hydrocarbon and halo-hydrocarbon radicals, said method comprising effecting reaction, in the presence of a hydrohalide acceptor, between approximately equimolecular proportions of (1) a mercapto pyrimidine corresponding to the general formula

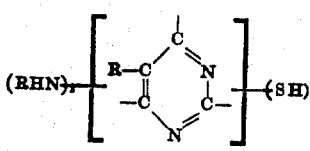

where R has the meaning above given, and (2) a compound corresponding to the general formula

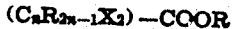

$(C_nR_{2n-1}X_2)-COOR$ where $n$, X and R have the meanings above given.

17. A method as in claim 16 where X represents a chlorine atom and the hydrohalide acceptor is an alkali-metal hydroxide.

18. A method as in claim 16 wherein X represents a bromine atom and the hydrohalide acceptor is an alkali-metal hydroxide.

19. The method of preparing a diamino pyrimidyl chloro carbomethoxy-ethyl sulfide which comprises effecting reaction, in the presence of a hydrohalide acceptor, between approximately equimolecular proportions of mercapto diamino pyrimidine and alpha, beta-dichloro carbomethoxy ethane.

20. The method of preparing a diamino pyrimidyl bromo carbomethoxy-ethyl sulfide which comprises effecting reaction, in the presence of a hydrohalide acceptor, between approximately equimolecular proportions of mercapto diamino pyrimidine and alpha,beta-dibromo carbomethoxy ethane.

GAETANO F. D'ALELIO.
JAMES W. UNDERWOOD.